United States Patent
Kim et al.

(10) Patent No.: US 7,251,119 B2
(45) Date of Patent: Jul. 31, 2007

(54) MULTILAYER CHIP CAPACITOR AND METHOD FOR MANUFACTURING THE SAME

(75) Inventors: Hyoung Ho Kim, Kyungki-do (KR); Hyo Soon Shin, Kyungki-do (KR); Ho Sung Choo, Kyungki-do (KR)

(73) Assignee: Samsung Electro-Mechanics Co., Ltd. (KR)

( * ) Notice: Subject to any disclaimer, the term of this patent is extended or adjusted under 35 U.S.C. 154(b) by 0 days.

(21) Appl. No.: 11/272,893

(22) Filed: Nov. 15, 2005

(65) Prior Publication Data

US 2006/0139848 A1    Jun. 29, 2006

(30) Foreign Application Priority Data

Dec. 23, 2004    (KR) ...................... 10-2004-0110924

(51) Int. Cl.
*H01G 4/06*    (2006.01)
*H01G 4/005*    (2006.01)

(52) U.S. Cl. ...................... 361/311; 361/303

(58) Field of Classification Search ........ 361/303–305, 361/311, 309
See application file for complete search history.

(56) References Cited

U.S. PATENT DOCUMENTS

| | | | |
|---|---|---|---|
| 3,237,066 A * | 2/1966 | Martin et al. | 361/305 |
| 3,978,378 A * | 8/1976 | Tigner et al. | 361/323 |
| 5,144,527 A | 9/1992 | Amano et al. | |
| 6,829,134 B2 * | 12/2004 | Yamauchi et al. | 361/303 |

* cited by examiner

*Primary Examiner*—Eric W. Thomas
(74) *Attorney, Agent, or Firm*—McDermott Will & Emery LLP

(57) ABSTRACT

A multilayer chip capacitor, and a method for manufacturing the same are provided. The capacitor includes a capacitor body having a plurality of dielectric layers stacked therein, a plurality of first and second internal electrodes formed on the dielectric layers, each of the internal electrodes including a main electrode portion and a lead portion, chip-protecting side members formed on both sides of the capacitor body to contact both sides of the first and second internal electrodes, and a pair of external electrodes formed on the outer surface of the capacitor body. The width of the main electrode portion is the same as that of the dielectric layers, and the width of the lead portion is smaller than that of the dielectric layers.

4 Claims, 11 Drawing Sheets

MULTILAYER CHIP CAPACITOR AND METHOD FOR MANUFACTURING THE SAME

RELATED APPLICATION

The present invention is based on, and claims priority from, Korean Application Number 2004-110924, filed Dec. 23, 2004, the disclosure of which is incorporated by reference herein in its entirety.

BACKGROUND OF THE INVENTION

1. Field of the Invention

The present invention relates to a multilayer chip capacitor, and, more particularly, to a multilayer chip capacitor, designed to avoid occurrence of cracks caused by a thickness difference and short circuit caused by misalignment of cutting lines, thereby enhancing reliability of devices, and a method for manufacturing the same.

2. Description of the Related Art

Generally, a multilayer chip capacitor (MLCC) comprises a plurality of dielectric layers referred to as ceramic green sheets and internal electrodes formed between the plurality of dielectric layers. Since such a multilayer chip capacitor can realize a higher electrostatic capacitance with a small size while being easily mounted on a substrate, it is widely used as a capacitive component of various electronic devices.

Such a multilayer chip capacitor is manufactured by alternately stacking dielectric layers having two internal electrodes of different polarities printed thereon to form a stack, compressing and sintering the stack, and then forming terminal electrodes at opposite ends of the stack. At this time, when forming the internal electrodes on the dielectric layers, margins are provided to each of the dielectric layers in a width direction of the internal electrode in order to prevent electrical short while protecting the internal electrodes. Accordingly, in view of the overall appearance of the chip capacitor, a thickness difference occurs between a central portion of the chip capacitor where the internal electrodes are formed and both sides of the chip capacitor where the margins are provided. Such a thickness difference of the chip capacitor causes cracks of the chip capacitor, in particular, during a sintering process, and is a negative influence on reliability of the capacitor.

FIG. 1 is a plan view illustrating a first internal electrode and a second internal electrode of a conventional multilayer chip capacitor. Referring to FIG. 1, the first and second internal electrodes 22 and 23 are printed on dielectric layers 12 and 13 generally referred to as ceramic green sheets. The first and second internal electrodes 22 and 23 extend longitudinally (an L-direction) from one end of the dielectric layers 12 and 13 towards the other end thereof, respectively. The lengths of the internal electrodes 22 and 23 are shorter than those of the dielectric layers 12 and 13, so that each of the internal electrodes is exposed only at one end of the dielectric layers 12 and 13, and is not exposed at the other end thereof. As a result, the dielectric layers 12 and 13 have longitudinal (L-direction) margin portions 32b and 33b of a predetermined size y, respectively. Additionally, the widths of the internal electrodes 22 and 23 are shorter than those of the dielectric layers 12 and 13, so that the dielectric layers 12 and 13 have widthwise (W-direction) margin portions 32a and 32b of a predetermined size x at both sides thereof, respectively. Herein, the term "widthwise (or W-direction) margin portion" means a margin portion between an edge of the dielectric layer and that of the internal electrode, and refers to a portion extending over the entire length of the dielectric layer. The W-direction margin portions 32a and 32b are needed to prevent electrical short while protecting the internal electrodes.

Meanwhile, when the stack is produced by alternately stacking and compressing the dielectric layers with the internal electrodes 22 and 23 formed thereon, the W-direction margin portions 32a and 33a cause a thickness difference to occur between the center of the chip capacitor and both sides thereof. In FIG. 2, a non-uniform thickness of the capacitor is illustrated. FIG. 2 is a cross section taken along line A-A' of FIG. 1, illustrating a stack of the dielectric layers having the internal electrodes formed thereon. The stack 100a of FIG. 2 is prepared by alternately stacking the dielectric layers 12 having the first internal electrodes 22 formed thereon and the dielectric layers 13 having the second internal electrodes 23 formed thereon. As shown in FIG. 2, a thickness t2 of the stack at the center of the internal electrodes is greater than a thickness t1 of the stack at the widthwise margin portions of the stack where the electrodes are not formed. When sintering the stack 100a having such a thickness difference, the thickness difference is further increased, causing lots of cracks to be created on the sintered stack 100b. Accordingly, when completely manufacturing the multilayer chip capacitor by forming the external electrodes on the stack, the multilayer chip capacitor is likely to malfunction due to the cracks.

In order to solve the problem resulting from the thickness difference, an approach has been suggested, wherein the electrodes are formed as thin as possible by reducing contents of metal, such as Ni, in conductive paste upon screen printing of the electrodes. However, it is difficult to print internal electrodes having a thickness of about 1 μm with current screen printing technology. On the other hand, although an approach has been suggested, wherein the thickness difference is complemented by printing dielectric slurries on a portion where the thickness difference occurs, this approach requires additional processes, and fails to completely solve the problem of cracks resulting from the thickness difference.

Additionally, in order to solve the problem caused by the thickness difference, U.S. Pat. No. 5,144,527 discloses an approach wherein the dielectric layers are stacked after forming the internal electrodes thereon without providing the W-direction margin portions. According to the disclosure, after stacking the dielectric layers, coating is performed on a drawing portion of the internal electrodes in order to protect the drawing portion during wet etching, and then wet etching is performed to form the W-direction margin portions. As such, due to complicated processes, this method is not only ineffective in terms of cost and time, but also difficult to secure uniformity of wet etching.

SUMMARY OF THE INVENTION

The present invention has been made to solve the above problems, and it is an object of the present invention to provide a multilayer chip capacitor, designed to prevent occurrence of cracks caused by a thickness difference between a central portion of the capacitor and both sides thereof, and electrical short caused by misalignment of a cutting line, thereby enhancing reliability of a device.

It is another object of the present invention to provide a method for forming a multilayer chip capacitor, which can prevent occurrence of cracks caused by the thickness difference between the central portion of the capacitor and both sides thereof, and electrical short caused by misalignment of a cutting line, thereby lowering frequency of defective devices.

In accordance with one aspect of the present invention, the above and other objects can be accomplished by the provision of a multilayer chip capacitor, comprising: a capacitor body having a plurality of dielectric layers stacked therein; a plurality of first and second internal electrodes formed on the dielectric layers, each of the internal electrodes including a main electrode portion and a lead portion; chip-protecting side members formed on both sides of the capacitor body to contact both sides of the first and second internal electrodes; and a pair of terminal electrodes formed on the outer surface of the capacitor body and connected to the internal electrodes through the lead portions, wherein the width of the main electrode portion is the same as that of the dielectric layers, and the width of the lead portion is smaller than that of the dielectric layers. According to the invention, since the width of the main electrode portion is the same as that of the dielectric layers, a widthwise margin portion is not provided.

One of the terminal electrodes may be connected only to the first internal electrodes, the other terminal electrode may be connected only to the second internal electrodes, and the pair of the terminal electrodes may have different polarities from each other. As a result, the first internal electrode has a polarity opposite to that of the second internal electrode.

The dielectric layers may have longitudinal margin portions formed at one end of the internal electrodes, respectively. The longitudinal margin portions formed at the one end of the first internal electrodes, and the longitudinal margin portions formed at the one end of the second internal electrodes may be alternately arranged.

The chip-protecting side members may be formed of ceramic material or epoxy resin. The chip-protecting side members are formed on both sides of the capacitor body, and prevent the internal electrodes from being shorted at both ends of the internal electrodes, thereby protecting an internal portion of the capacitor.

According to the invention, since the width of the main electrode portion is the same as that of the dielectric layers, the widthwise margin portion is not provided. Moreover, the width of the lead portion contacting the terminal electrodes is smaller than that of the dielectric layers. These characteristics of the invention can prevent an undesirable short between the internal electrodes and the terminal electrodes having different polarities from each other as well as allowing uniform thickness of the multilayer chip capacitor.

In accordance with another aspect of the present invention, a method for manufacturing a multilayer chip capacitor is provided, comprising: forming screen patterns on a plurality of mother green sheets such that a widthwise margin is not formed on the mother green sheets, and the width of each screen pattern is greater than the distance between the screen patterns; forming first internal electrode patterns and second internal electrode patterns on the plurality of mother green sheets by use of the screen patterns; forming a stack of the mother green sheets by stacking the plurality of mother green sheets having the internal electrode patterns formed thereon; forming a capacitor body having a plurality of first and second internal electrodes, each of the internal electrodes comprising a main electrode portion and a lead portion, formed therein, by cutting the stack of the mother green sheets along cutting lines arranged in a width direction and a longitudinal direction; forming chip-protecting side members on both sides of the capacitor body such that the chip-protecting side members contact both sides of the internal electrodes, respectively; and forming a pair of terminal electrodes on the outer surface of the capacitor body such that the terminal electrodes are connected to the internal electrodes through the lead portions.

The step of forming the internal electrode patterns may comprise printing conductive paste on the mother green sheets using the screen patterns as a print mask, and drying the printed conductive paste.

The step of forming the stack of the mother green sheets may comprise alternately stacking the mother green sheets having the first internal electrode patterns formed thereon and the mother green sheets having the second internal electrode patterns formed thereon. In this case, the first internal electrode patterns and the second internal electrode patterns must be alternately stacked.

Each of the screen patterns may cover longitudinal margin portions. In this case, the area of the screen patterns is larger than the area of the regions corresponding to the longitudinal margin portions.

The screen patterns may be formed such that the width of each screen pattern is greater than the distance between the screen patterns. For this purpose, the screen patterns may be arranged to partially overlap each other in the width direction. In this case, the width of each screen pattern is greater than the distance between the cutting lines arranged in the width direction. As a result, the capacitor of the invention may have the lead portion having a narrower width than that of the main electrode portion. Additionally, even if misalignment of the cutting lines occurs, undesired short between the internal electrodes and the external electrodes can be prevented.

According to the invention, the chip-protecting members are formed on both sides of the capacitor body without forming the widthwise margin portion, thereby preventing local thickness variation from being created in the multilayer chip capacitor and the electrical short on both sides of the internal electrodes. Accordingly, the cracks can be avoided on the capacitor, and reliability thereof can be enhanced.

BRIEF DESCRIPTION OF THE DRAWINGS

The above and other objects, features and other advantages of the present invention will be more clearly understood from the following detailed description taken in conjunction with the accompanying drawing.

DESCRIPTION OF THE PREFERRED EMBODIMENTS

Figure 1:
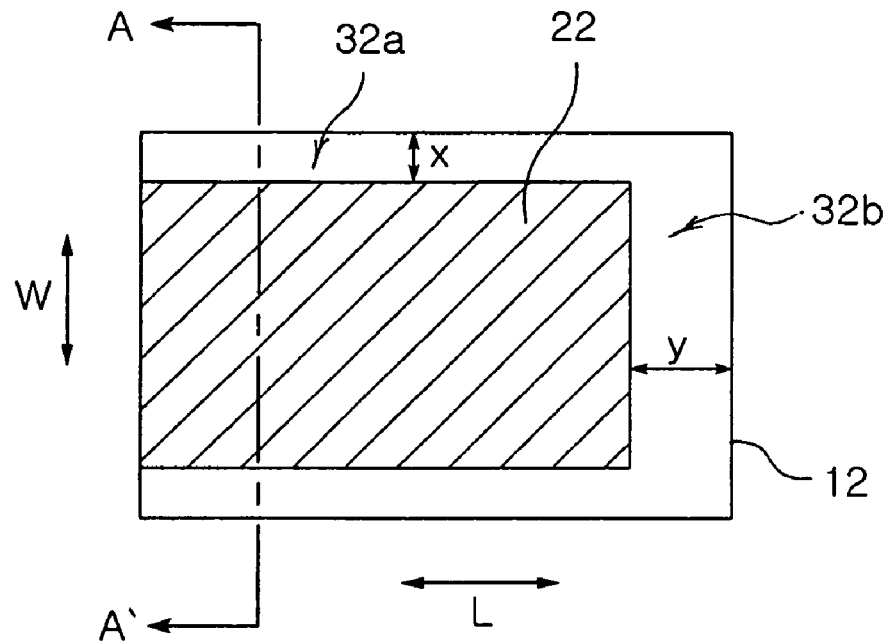
FIG. 1 is a plan view illustrating a first internal electrode and a second internal electrode of a conventional multilayer chip capacitor.
Figure 1:
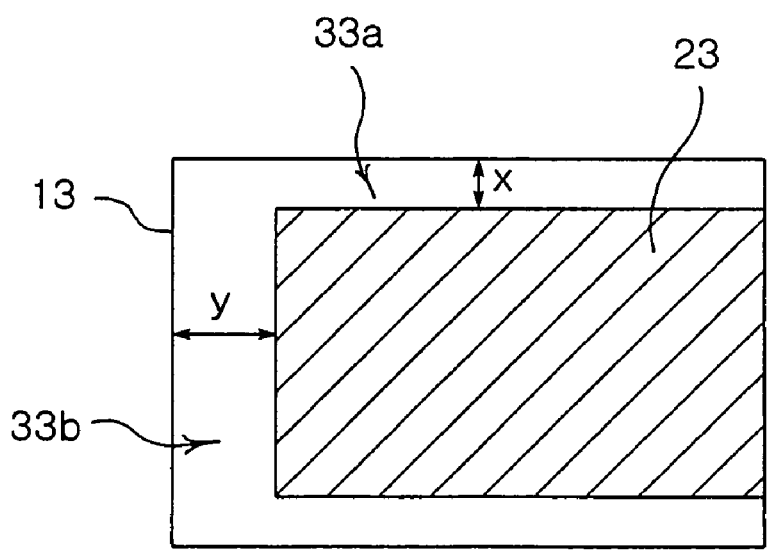
Figure 2:
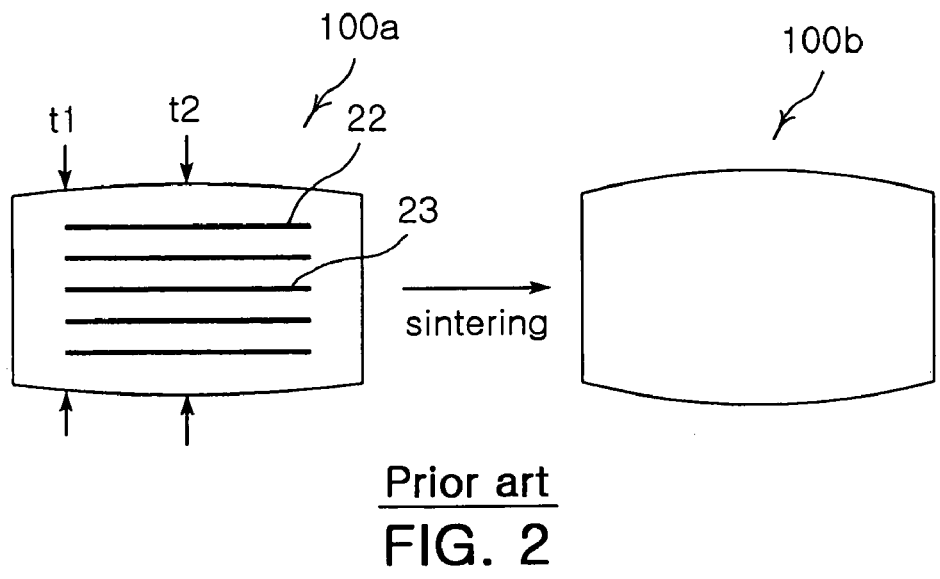
FIG. 2 is a cross section taken along line A-A' of FIG. 1, illustrating a stack of dielectric layers having the internal electrodes formed thereon.

Preferred embodiments will now be described in detail with reference to the accompanying drawings. It should be noted that the embodiments of the invention can be modified in various shapes, and that the present invention is not limited to the embodiments described herein. The embodiments of the invention are described so as to enable those having an ordinary knowledge in the art to have a perfect understanding of the invention. Accordingly, shape and size of components of the invention are enlarged in the drawings for clear description of the invention. Like components are indicated by the same reference numerals throughout the drawings.

Figure 3:
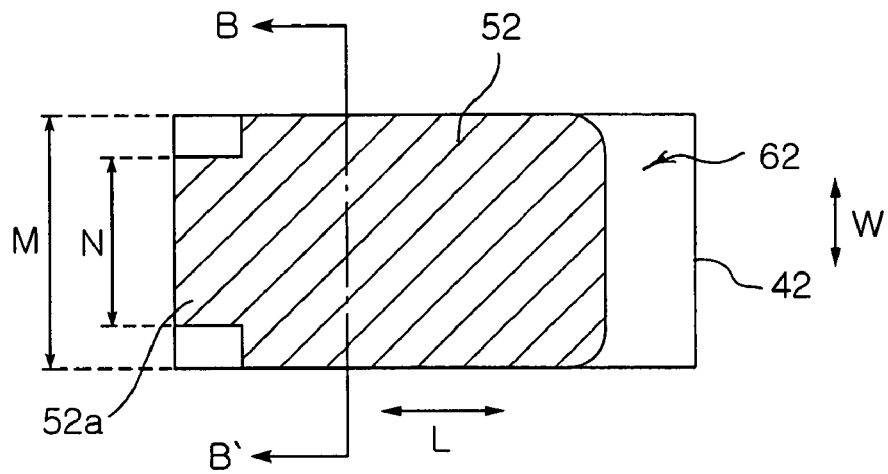
FIG. 3 is plan views illustrating a first internal electrode and a second internal electrode of a multilayer chip capacitor in accordance with one preferred embodiment of the present invention.
Figure 3:
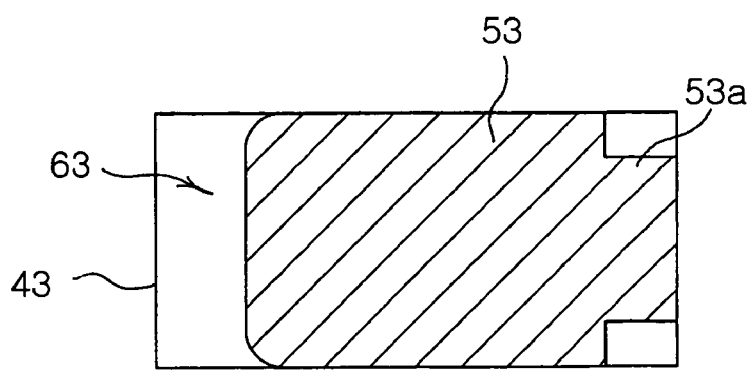

FIG. 3 is plan views illustrating a first internal electrode and a second internal electrode of a multilayer chip capacitor in accordance with one preferred embodiment of the present invention. Referring to FIG. 3, a first internal electrode 52 and a second internal electrode 53 are formed on dielectric layers 42 and 43, respectively. Each of the internal electrodes 52 and 53 comprises a main electrode portion having the same width M as that of the dielectric layers 42 and 43, and a lead portion 52a or 53a having a width N smaller than the width M. Accordingly, the dielectric layers 42 and 43 are not formed with a widthwise (W-direction) margin portion. However, the dielectric layers 42 and 43 can be formed with longitudinal (L-direction) margin portions 62 and 63, respectively.

The lead portions 52a and 53a extend from the main electrode portion, and are drawn from one end of the dielectric layers 42 and 43. The lead portions 52a and 53a act to connect the internal electrodes 52 and 53 to terminal electrodes, respectively. The width N of the lead portions 52a and 53a is smaller than the width M of the main electrode portion of the internal electrodes 52 and 53. In this manner, with a design wherein the width N of the lead portions 52a and 53a is smaller than the width M of the main electrode portion of the internal electrodes 52 and 53, undesired short between the internal electrodes 52 and 53 and the terminal electrodes is prevented, as described below.

Figure 4:
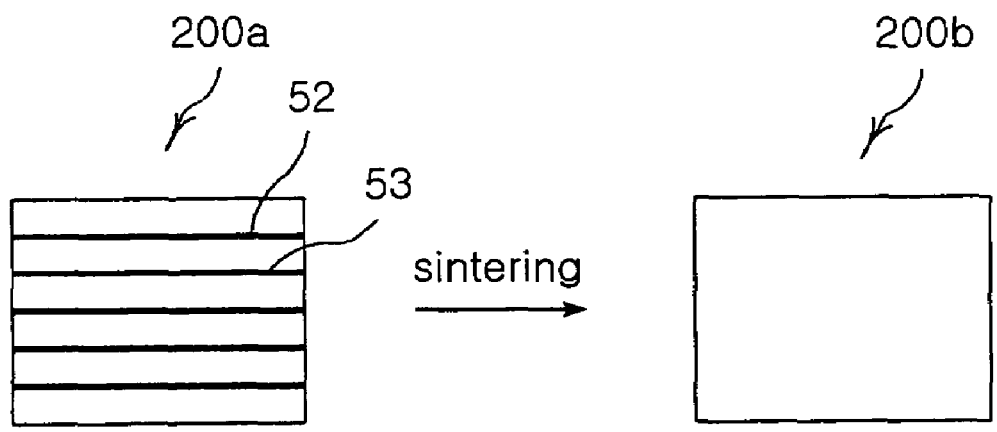
FIG. 4 is a cross section taken along line B-B' of FIG. 3, illustrating a stack of dielectric layers having the internal electrodes formed thereon.

FIG. 4 is a cross section taken along line B-B' of FIG. 3, illustrating a stack of dielectric layers having the first internal electrodes formed thereon. The stack 200a is formed by alternately stacking the dielectric layers 42 and 43 having the internal electrodes 52 and 53 formed thereon. When forming the stack 200a, the L-direction margin portions 62 formed at one end of the first internal electrodes 52, and the L-direction margin portions 63 formed at one end of the second internal electrodes 52 must be alternately arranged.

As shown in FIG. 4, since the W-direction margin portion is not formed, the stack 200a can have a uniform thickness. Accordingly, even if a sintered stack 200b is formed by compressing and stacking the stack 200a, the sintered stack 200b does not suffer from thickness variation. Accordingly, unlike the conventional capacitor, the multilayer chip capacitor of the invention does not suffer from cracks due to the thickness variation.

Figure 5:
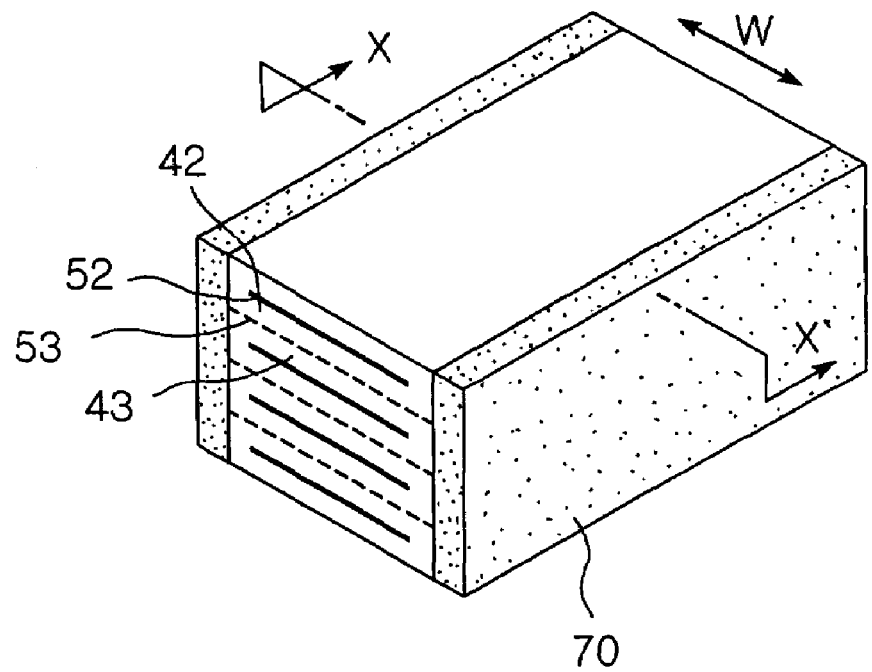
FIG. 5 is a schematic perspective view illustrating the multilayer chip capacitor having chip-protecting side members formed on both sides of the stack of the dielectric layers having the internal electrodes of FIG. 3 formed thereon.

However, when the W-direction margin portion is not formed, both sides of the internal electrodes 52 and 53 are exposed to the outside of the stack 200b, as shown in FIG. 4. Thus, the first internal electrode 52 is connected to the second internal electrode 53 via foreign matter, such as moisture, causing a short at both ends of the internal electrodes. In order to prevent the short, as shown in FIG. 5, chip-protecting side members 70 are formed at both sides of the stack of the dielectric layers. The chip-protecting side members 70 may be formed of, for example, epoxy resin or ceramic material.

Figure 6:
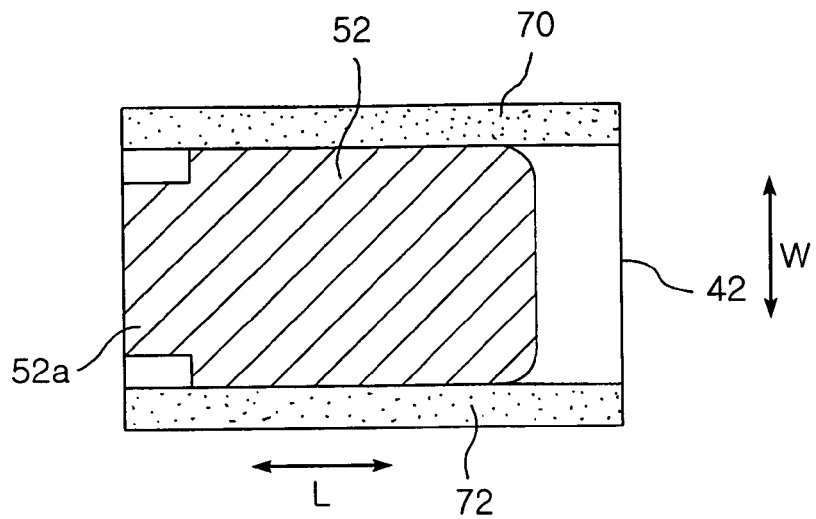
FIG. 6 is horizontal cross sections of the internal electrodes of FIG. 5.
Figure 6:
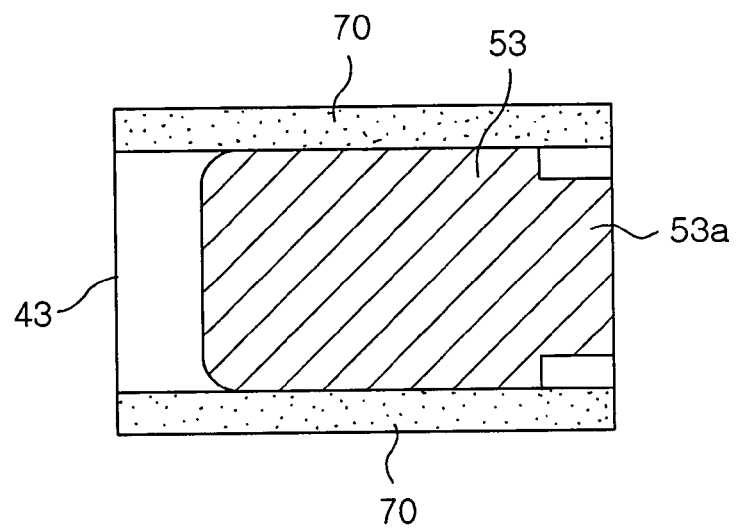
Figure 7:
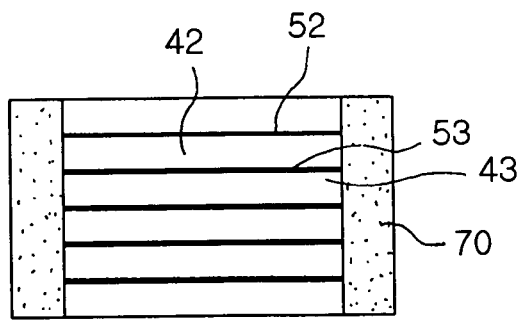
FIG. 7 is a cross section taken along line X-X' of FIG. 5.

FIG. 6 is horizontal cross sections of the internal electrodes of FIG. 5. FIG. 7 is a cross section taken along line X-X' of FIG. 5. As shown in FIGS. 6 and 7, the dielectric layers 42 and 43 do not have the widthwise margin portion, and the width of the lead portions 52a and 53a is smaller than that of the main electrode portion (that is, the width of the dielectric layers). Additionally, the chip-protecting side members 70 are formed at both sides of the dielectric layers 42 having the first internal electrodes 52 formed thereon, and at both sides of the dielectric layers 43 having the second internal electrodes 53 formed thereon. The chip-protecting side members 70 prevent the short between the internal electrodes while protecting an internal portion of the chip capacitor from foreign matter (such as moisture) or external impact.

A method for manufacturing a multilayer chip capacitor in accordance with one preferred embodiment of the invention will be described as follows. FIGS. 8 to 12 are diagrams illustrating the method for manufacturing the multilayer chip capacitor in accordance with the embodiment of the invention.

Figure 8:
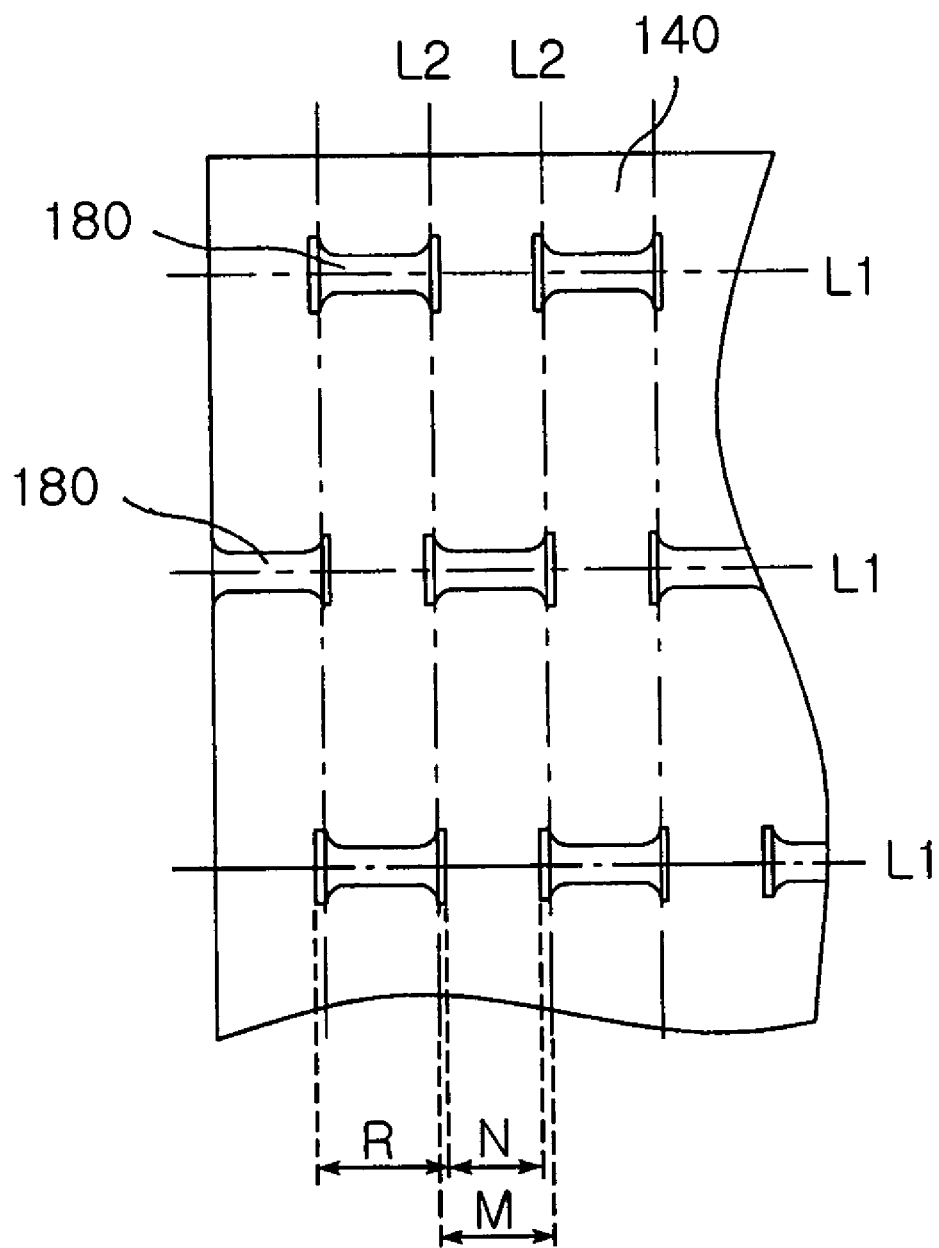
FIGS. 8 to 12 are diagrams illustrating a process of manufacturing a multilayer chip capacitor in accordance with one preferred embodiment of the present invention.

First, referring to FIG. 8, screen patterns 180 are formed on a mother green sheet 140 formed of dielectrics. The mother green sheet 140 will become dielectric layers 42 and 43 as shown in FIG. 3, after being cut in a later process. The regions that the screen patterns 180 cover will form longitudinal margin portions (that is, L-direction margin portions).

In FIG. 8, reference numerals L1 and L2 indicate cutting lines arranged in the longitudinal direction and the widthwise direction, respectively. As shown in FIG. 8, the screen patterns 180 are formed such that the widthwise margin portion (such as the margin portions 62 and 63 of FIG. 3) is not formed on the mother green sheet 140. Further, the screen patterns 180 are formed such that the width R of each screen pattern is greater than the distance N between the screen patterns on each mother green sheet. For this purpose, the screen patterns 180 are arranged to partially overlap each other in the width direction. Accordingly, the area of the screen patterns 180 is larger than the area of the regions corresponding to longitudinal margin portions.

Since the width R of the screen patterns is larger than the distance N between the screen patterns, the distance N between the screen patterns becomes smaller than a distance M between the cutting lines L2 arranged in the width direction. The distance N between the screen patterns corresponds to the width of the lead portion (52a and 53a of FIG. 3), as described below. Additionally, the distance M between the cutting lines L2 corresponds to the width of the main electrode portion of the internal electrode. As a result, with the screen patterns as shown in FIG. 8 formed on the mother green sheet, it is possible to prevent the widthwise margin portion from being formed thereon, and to form the lead portion to have the smaller width than that of the main electrode portion.

Figure 9:
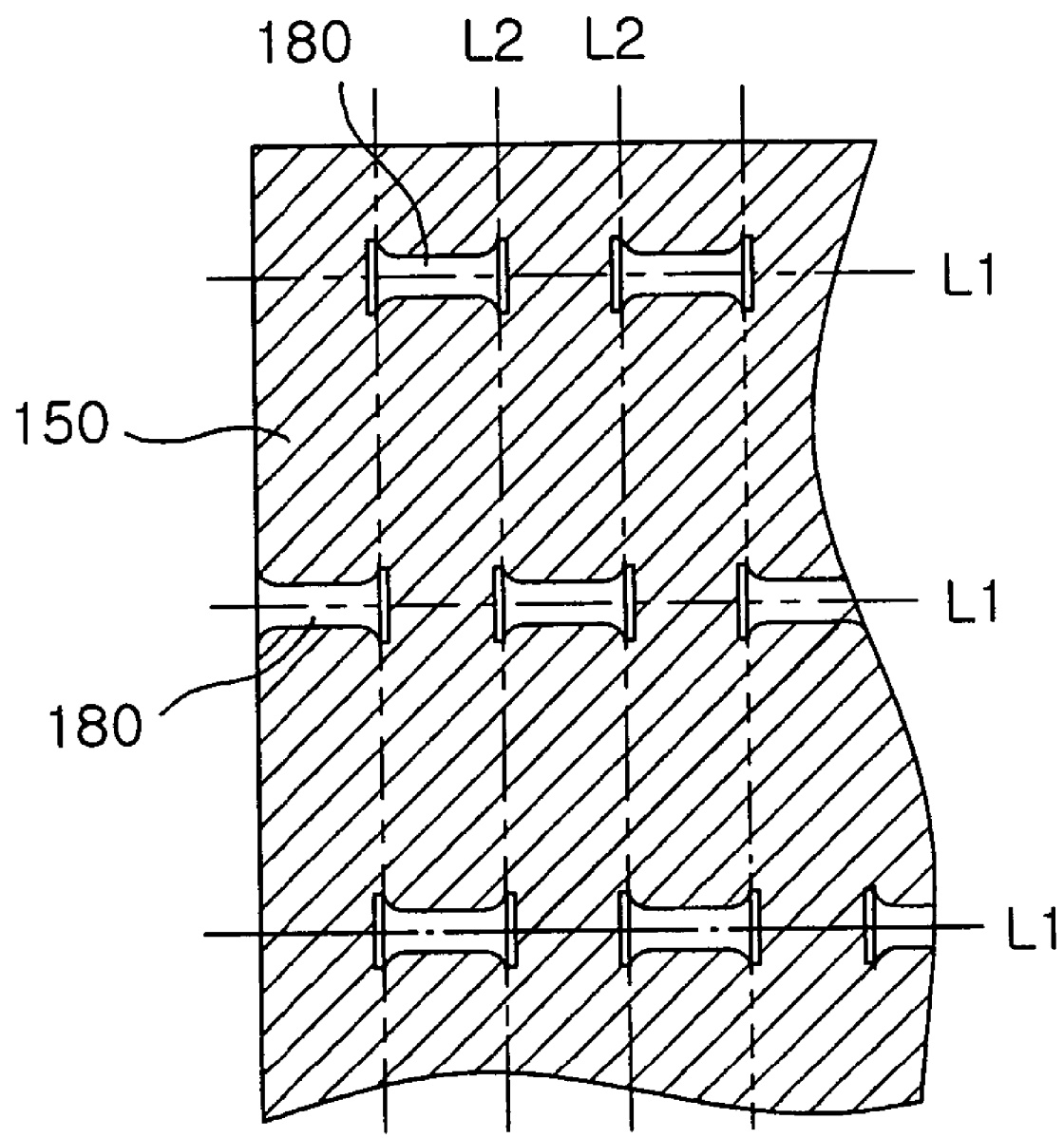

Next, as shown in FIG. 9, conductive paste is printed on the mother green sheet 140 using the screen patterns 180, and is then dried, forming internal electrode patterns 150. The internal electrode patterns 150 comprise first internal electrode patterns and second internal patterns. In other words, the first internal electrode pattern is printed on one mother green sheet, and the second internal electrode pattern is printed on the other mother green sheet. At this time, the first internal electrode patterns, and the second internal electrode patterns are formed on the plurality of mother green sheets such that when stacking the plurality of mother green sheets to form a stack, the first internal electrode patterns and the second internal electrode patterns are alternately arranged in the stack. Then, the mother green sheets having the first internal electrode patterns formed thereon, and the mother green sheets having the second internal electrode patterns formed thereon are alternately stacked, thereby forming the stack.

Figure 10:
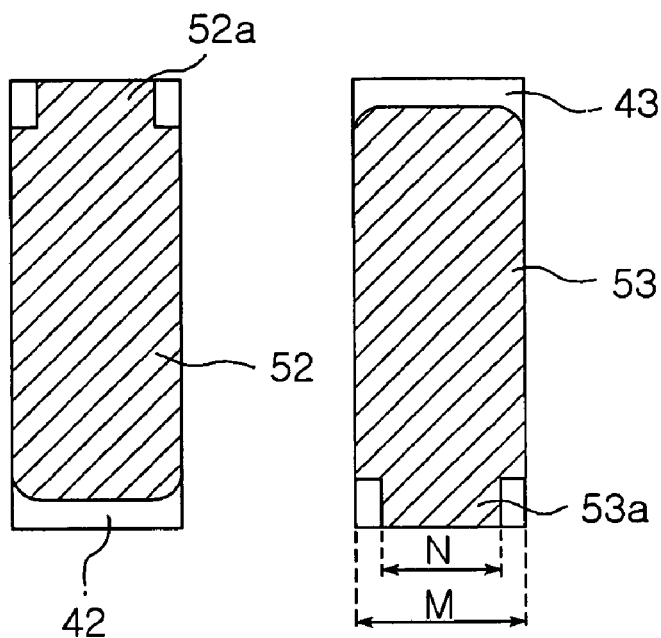

Next, a plurality of capacitor bodies are formed by cutting the stack of the mother green sheets along the cutting lines L1 and L2 shown in FIG. 9. FIG. 10 is plan views illustrating internal electrodes of a capacitor body formed by cutting the stack of the mother green sheets. As shown in FIG. 10, the main electrode portion of the internal electrodes 52 and 53 has the same width M as that of the dielectric layers 42 and 43. Accordingly, the dielectric layers 42 and 43 are not formed with the widthwise margin portion. In this case, the width M of the main electrode portion corresponds to the distance between the cutting lines L2. Additionally, the internal electrodes 52 and 53 have the lead portions 52a and 53a having the width N smaller than the width M of the main electrode portion, respectively. The width N of the lead portions 52a and 53a corresponds to the distance between the screen patterns.

Figure 11:
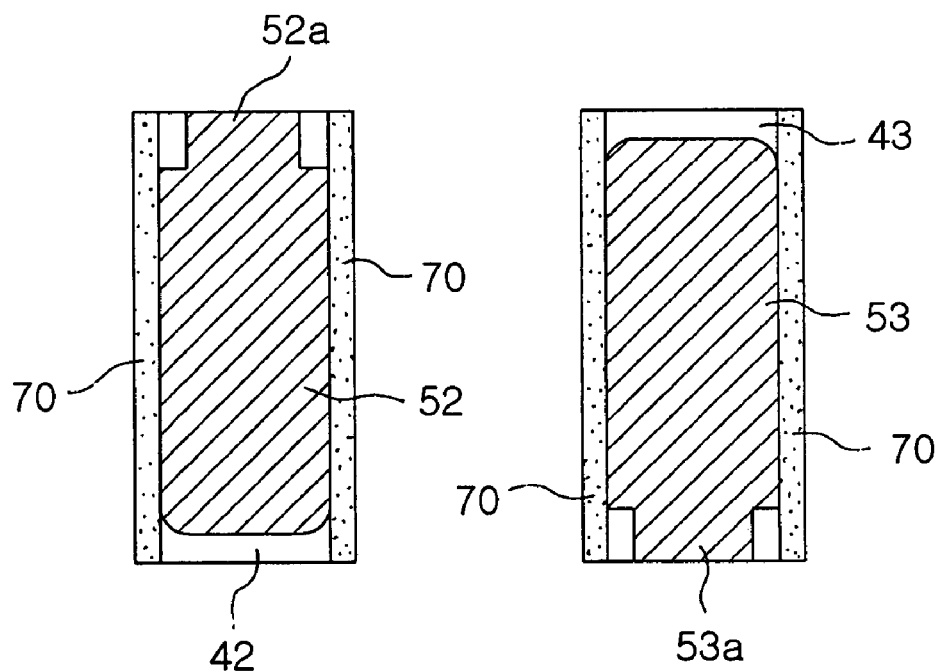

Next, each capacitor body is compressed and sintered. Then, as shown in FIG. 11, chip-protecting side members 70 are formed on both sides of the capacitor body in order to prevent a short between the internal electrodes 52 and 53 while protecting an inner portion of the chip capacitor. The chip-protecting side members 70 may be formed of, for example, ceramic material or epoxy resin.

Figure 12:
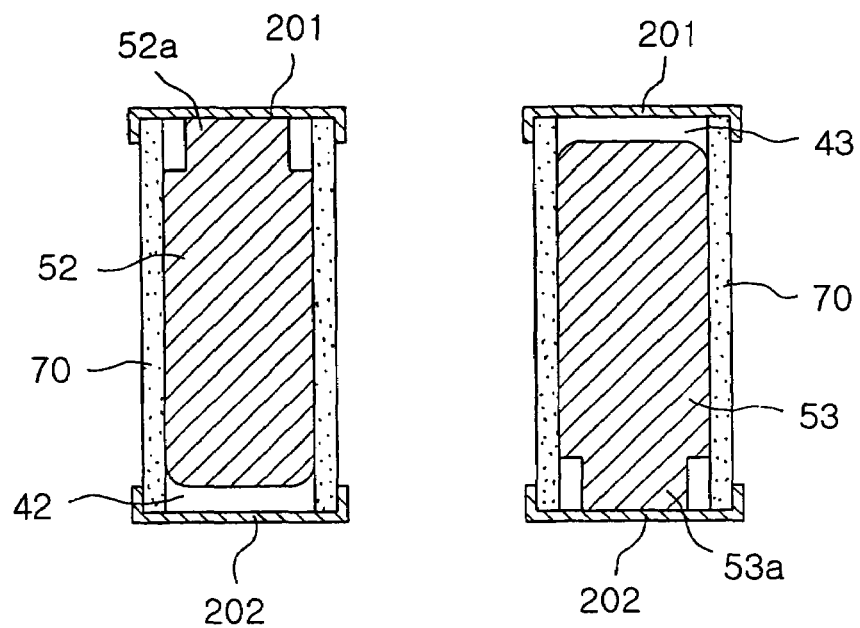

Next, as shown in FIG. 12, a pair of terminal electrodes 201 and 202 is formed on the outer surface of the capacitor body. One terminal electrode 201 of the pair of terminal electrodes 201 and 202 is connected to the first internal electrode 52 through the lead portion 52a, and the other terminal electrode 202 is connected to the second internal electrode 53 through the lead portion 53a. As a result, the polarity of the first internal electrode 52 is opposite to that of the second internal electrode 53.

According to the method of the embodiment as described above, the screen patterns 180 are formed to have the width greater than the distance therebetween. For this purpose, the screen patterns 180 are arranged to partially overlap each other in the width direction. When the screen patterns 180 are formed in this manner, the capacitor of the invention may have the lead portion having the narrower width than that of the main electrode portion. Additionally, even if misalignment of the cutting lines L2 occurs, undesired short between the internal electrodes and the external electrodes can be prevented.

Figure 14:
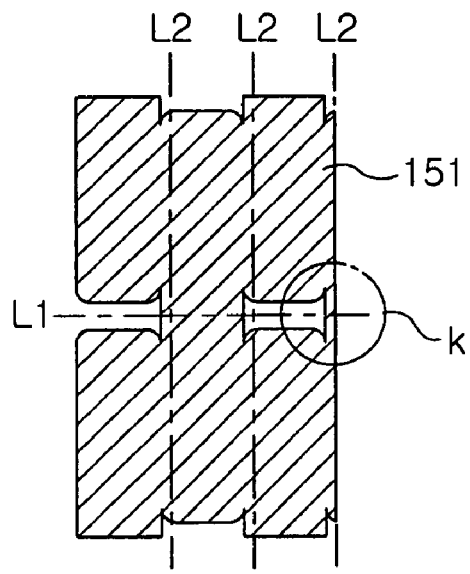
Figure 15:
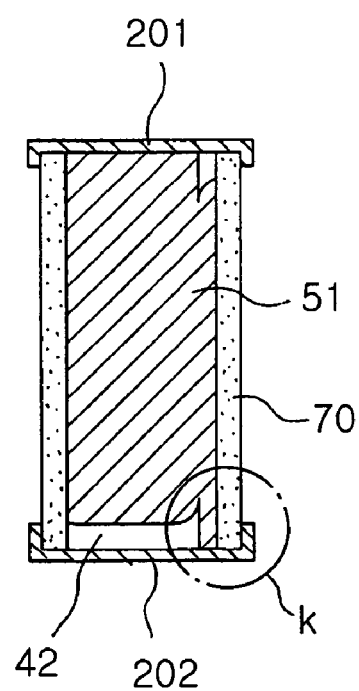

When the screen patterns 180 are formed to have the width of the screen pattern identical to the distance between the screen patterns without the widthwise margin portion, the misalignment of the cutting lines L2 results in the short between the internal electrodes and the external electrodes, thereby causing defective devices. For the purpose of illustrating this problem, FIGS. 13 to 15 illustrate a process of manufacturing a multilayer chip capacitor without the widthwise margin portion.

Figure 13:
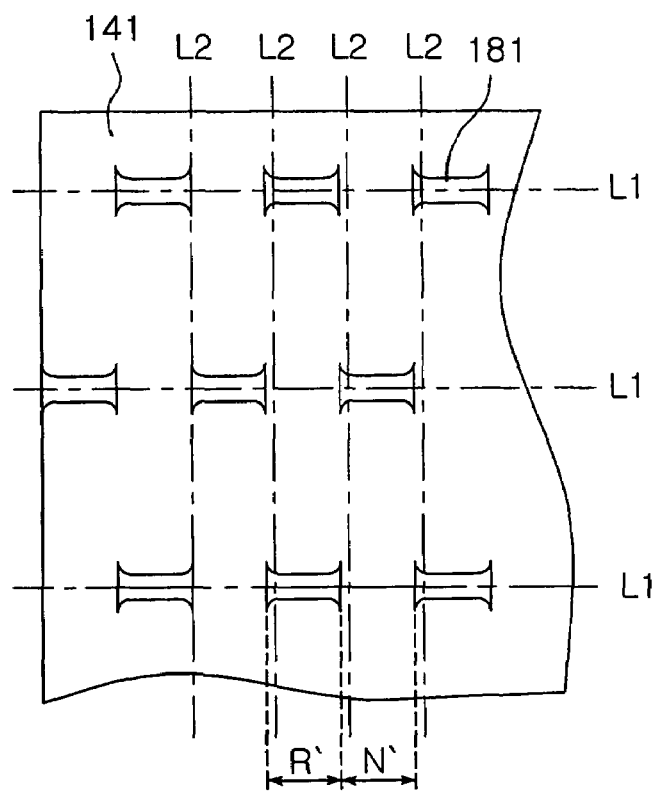
FIGS. 13 to 15 are diagrams illustrating a process of manufacturing a multilayer chip capacitor without a widthwise margin portion, in which misalignment of cutting lines occurs during the process.

First, referring to FIG. 13, screen patterns 181 are formed on a mother green sheet 141. The screen patterns 181 are formed such that the widthwise margin portion is not formed on the mother green sheet 141. However, unlike the previous embodiment, the screen patterns 181 are formed to have the width R' of each screen pattern identical to a distance N' between the screen patterns 181. Then, as shown in FIG. 14, internal electrode patterns 151 are formed on the mother green sheet 141 using the screen patterns 181. After cutting and sintering processes, chip-protecting side members 70, and terminal electrodes 201 and 202 are formed on a capacitor body, thereby forming a resultant shown in FIG. 15. Meanwhile, during the cutting process, misalignment can occur between cutting lines L2 arranged in the width direction, as shown in FIGS. 13 and 14. As such, when the cutting lines L2 are misaligned, an undesired short-circuit portion k will be formed, as shown in FIGS. 14 and 15. When the terminal electrodes 201 and 202 are formed in this state, one internal electrode 51 is connected at the same time to the two terminal electrodes 201 and 202 having opposite polarities, as shown in FIG. 15. As a result, the multilayer chip capacitor cannot be appropriately operated due to defectiveness of devices.

Figure 16:
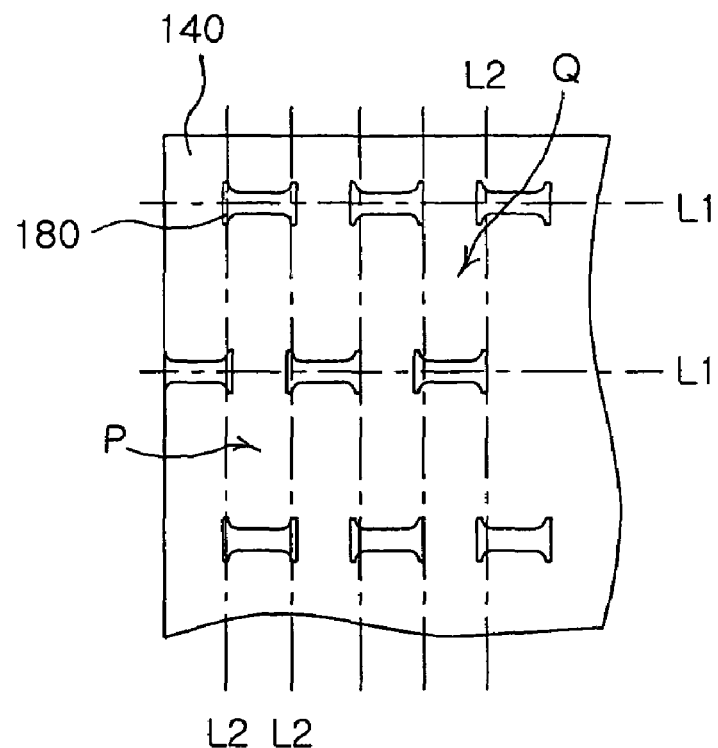
FIGS. 16 to 18 are diagrams illustrating a process of manufacturing a multilayer chip capacitor in accordance with one embodiment of the present invention, in which misalignment of cutting lines occurs during the process.
Figure 17:
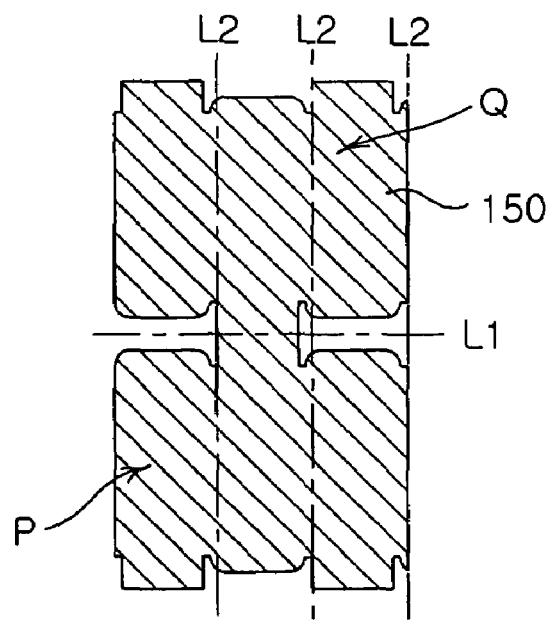
Figure 18:
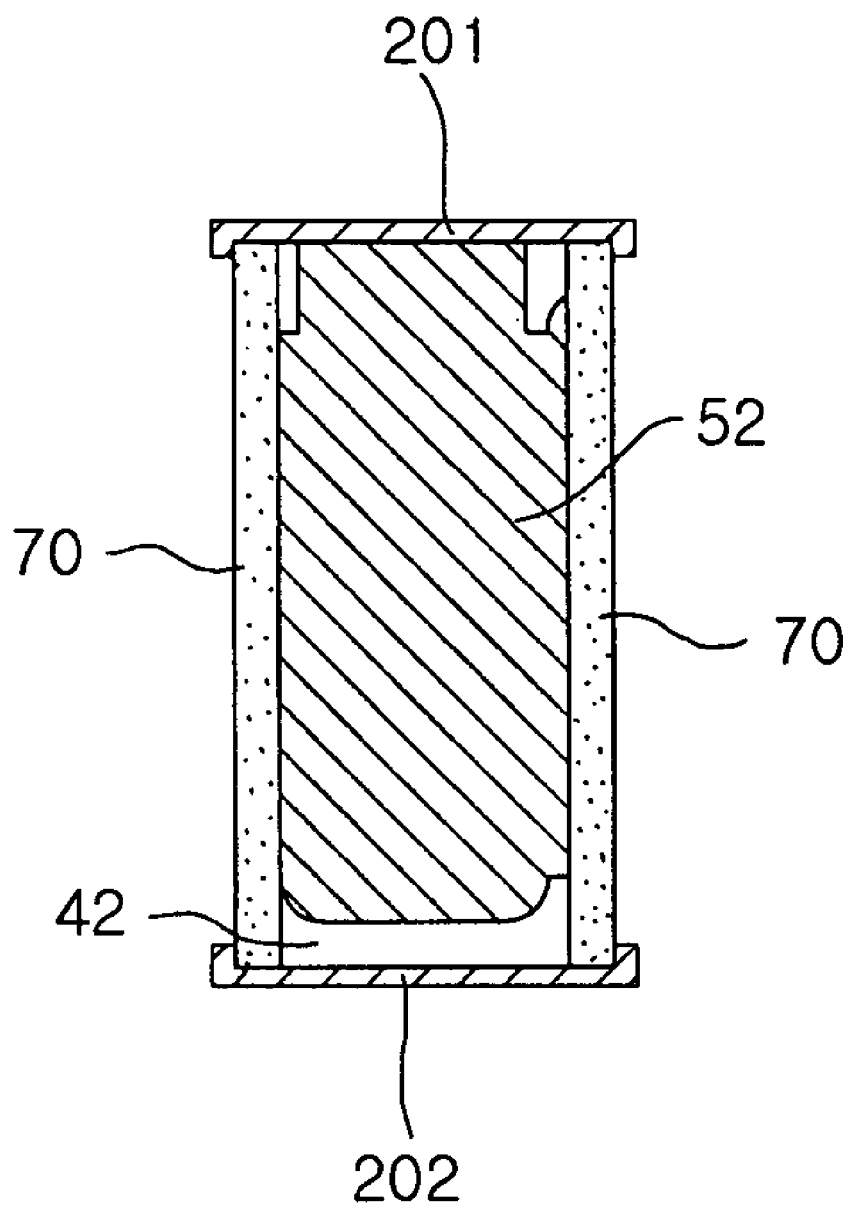

However, according to the present invention, even if misalignment of the cutting lines occurs during the manufacturing process, the undesired short between the internal electrode and the terminal electrodes can be prevented. FIGS. 16 to 18 are diagrams illustrating a process of manufacturing a multilayer chip capacitor in accordance with one embodiment of the present invention, in which misalignment of the cutting lines occurs during the process. Referring to FIGS. 16 to 18, when screen patterns 180 are formed to have a screen pattern width greater than the distance between the screen patterns, the short-circuited portion k as shown in FIG. 15 is not formed even if misalignment of the cutting lines L2 occurs.

As shown in FIGS. 16 and 17, the cutting lines L2 are not misaligned in a P region, whereas the cutting lines L2 are misaligned in a Q region. As such, even if misalignment of the cutting lines L2 occurs in the Q region, an internal electrode 52 in the Q region is, as shown in FIG. 18, connected only to a terminal electrode 201 having the same polarity as that of the internal electrode 52, and is not connected to a terminal electrode 202 having different polarity from that of the internal electrode 52. This is because the screen patterns 180 are formed to have the width greater than the distance between the screen patterns. As a result, the present invention can enhance reliability of the device.

As apparent from the above description, the multilayer chip capacitor of the invention is formed with the chip-protecting side members at both sides of a capacitor body without the widthwise margin portion, thereby preventing local thickness variation therein as well as short circuit at both sides of the internal electrodes. Accordingly, the present invention can avoid cracks of the capacitor while enhancing reliability of the capacitor. Additionally, screen patterns are formed to have the width of each screen pattern greater than the distance between the screen patterns, thereby preventing a short resulting from misalignment of cutting lines during the manufacturing process. As a result, the present invention can reduce a frequency of defective devices while enhancing reliability of the device.

It should be understood that the embodiments and the accompanying drawings have been described for illustrative purposes and the present invention is limited only by the following claims. Further, those skilled in the art will appreciate that various modifications, additions and substitutions are allowed without departing from the scope and spirit of the invention as set forth in the accompanying claims.

What is claimed is:

1. A multilayer chip capacitor, comprising:

a capacitor body having a plurality of dielectric layers stacked therein;

a plurality of first and second internal electrodes formed on the dielectric layers, each of the internal electrodes including a main electrode portion and a lead portion;

two chip-protecting side members formed on both sides of the capacitor body, respectively, to contact both sides of the first and second internal electrodes, the chip-protecting side members extending along the entire length of the both sides of the capacitor body, respectively; and a pair of terminal electrodes formed on the outer surface of the capacitor body and connected to the internal electrodes through the lead portions, wherein the width of the main electrode portion is the same as that of the dielectric layers, and the width of the lead portion is smaller than that of the main electrode portion.

2. The capacitor as set forth in claim 1, wherein one of the terminal electrodes is connected only to the first internal electrodes, and the other terminal electrode is connected only to the second internal electrodes, the first internal electrodes having a polarity opposite to that of the second internal electrodes.

3. The capacitor as set forth in claim 1, wherein the dielectric layers have longitudinal margin portions formed at one end of the internal electrodes, respectively.

4. The capacitor as set forth in claim 1, wherein the chip-protecting side members are formed of ceramic material and epoxy resin.

* * * * *